(12) United States Patent
Goss

(10) Patent No.: US 6,748,095 B1
(45) Date of Patent: *Jun. 8, 2004

(54) HEADSET WITH MULTIPLE CONNECTIONS

(75) Inventor: Raymond G. Goss, Austin, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,608

(22) Filed: Nov. 2, 1999

Related U.S. Application Data (63) Continuation-in-part of application No. 09/103,114, filed on Jun. 23, 1998, now Pat. No. 6,041,130.

(51) Int. Cl.[7] .............................. H04R 25/00
(52) U.S. Cl. ................. 381/374; 381/375; 381/388; 381/390; 379/430
(58) Field of Search .................. 381/370, 375, 381/356, 374, 376, 367, 358, 77, 80, 81, 85, 362, 390, 392, 381, 182, 372; 379/430, 433.02, 433.03, 433.06; 455/78, 79, 103, 104, 568, 115, 126, 67.1, 500, 463, 59, 51, 569, 132, 133, 174.1, 194.1, 3.06, 149, 191.3, 197.1

(56) References Cited

U.S. PATENT DOCUMENTS

| | | | |
|---|---|---|---|
| 3,688,052 A | * | 8/1972 | Self |
| 3,916,312 A | * | 10/1975 | Campbell |
| 4,085,365 A | * | 4/1978 | Reick |
| 4,392,243 A | * | 7/1983 | Ohhashi et al. |
| 4,524,461 A | * | 6/1985 | Kostanty et al. |
| 4,621,372 A | * | 11/1986 | Relyea |
| 4,754,486 A | * | 6/1988 | Stafford et al. |
| 4,875,233 A | | 10/1989 | Derhaag et al. |
| 5,095,382 A | * | 3/1992 | Abe |
| 5,109,410 A | * | 4/1992 | Suhami et al. |
| 5,125,032 A | | 6/1992 | Meister et al. |
| 5,142,700 A | * | 8/1992 | Reed |
| 5,151,922 A | * | 9/1992 | Weiss |
| 5,220,677 A | * | 6/1993 | Brooks |
| 5,363,402 A | * | 11/1994 | Harmon |
| 5,493,697 A | * | 2/1996 | May |
| 5,596,638 A | * | 1/1997 | Paterson et al. |
| 5,615,410 A | * | 3/1997 | DeMars |
| 5,673,325 A | * | 9/1997 | Andrea et al. |
| 5,978,689 A | * | 11/1999 | Tuoriniemi et al. |
| 6,041,130 A | * | 3/2000 | Goss |
| 6,154,890 A | * | 12/2000 | Deopuria et al. |

* cited by examiner

Primary Examiner—Curtis Kuntz
Assistant Examiner—Dionne N. Harvey (57) ABSTRACT

A headset and a method for using a headset, to communicate with two separate devices. The headset comprises a mounting member for mounting and holding the headset on the head of a wearer, at least a first speaker, and means for connecting the speaker to the mounting member for holding the speaker adjacent an ear of the wearer. The headset further comprises first and second microphones, and a boom member connecting the microphones to the mounting member for holding the microphones adjacent the mouth of the wearer. A signal conducting circuit is provided for transmitting input communication signals from at least the first device to the first speaker, and for transmitting output communications from the first and second microphones to the first and second devices respectively.

13 Claims, 8 Drawing Sheets

HEADSET WITH MULTIPLE CONNECTIONS

CROSS-REFERENCES

This application is a continuation-in-part of application Ser. No.: 09/103,114 filed Jun. 23, 1998, now U.S. Pat. No. 6,041,130.

BACKGROUND OF THE INVENTION

1. Field of the Invention

The present invention generally relates to telecommunications, and more specifically, the present invention relates to communications or call centers that receive and transmit communications over both telephone and computer networks. Even more specifically, the present invention relates to a computer controlled communications switch, for use at such call centers, that automatically connects an agent to the appropriate network, either the telephone network or the computer network, depending on which network is being used to make or receive a particular communication call.

2. Discussion of the Related Art

In the telecommunications industry, call centers are used to provide customer and operator services for business clients. Traditionally, customers of these business clients place a phone call to a toll-free telephone number to reach a call center customer service agent, and these agents then provide some type of service over the telephone for the customers. In many existing call centers, the service agents use telesets or automated call distribution pads to place and receive telephone calls. These telesets have headsets or handsets that the agents use to communicate with customers.

The telecommunications industry is changing, and for example, more and more people are conducting business on the Internet. Internet telephony is growing in popularity and improving in quality. Some of the advantages of internet telephony include application sharing, white boarding, and the ability to make calls without a telephone.

In order for the customer service agents at call centers to also participate in voice over internet telephony, it is necessary that those agents be provided with equipment that will enable them to conduct voice communication over the internet as well as over conventional telephone networks. One way to do this is to provide the call center agents with expensive internet telephony gateways that will link the automated call distribution pads to the Internet, or the agents may use a speaker and microphone connected to personal computers. Another option is to equip the agents with a headset that will work with both their telesets and their personal computers.

Standard current amplified headsets are four wire devices. In these devices, two wires are used for the microphone, and the other two wires are for the earpiece. Typical personal computer microphones and speakers also are each a two-wire device, and it is not difficult to connect a standard headset to a personal computer. There are devices presently available that allow a single headset to work with both a personal computer and a telephone, and for example, the headset may include a switch, referred to as a PC switch, to allow the headset to communicate with a personal computer.

One disadvantage with these switches is that they are manually controlled. This may not be a significant problem for the ordinary individual that is making outbound calls on a telephone or listening to audio on a personal computer. However, in a call center environment, systems are automated and often the telephone does not event ring, e.g., calls are delivered when the agents are available. Under these circumstances, it would be very confusing for the agent to have to manually switch between the personal computer and the teleset to handle internet calls and telephone network calls.

SUMMARY OF THE INVENTION

In accordance with a first aspect, the present invention is directed to a headset for communicating with two separate devices. The head set comprises a mounting member for mounting and holding the headset on the head of a wearer, first and second speakers for receiving input communication signals and converting the input communication signals to audible communications for the wearer, means for connecting the speakers to the mounting member for holding the speakers adjacent to an ear of the wearer, at least a first microphone for receiving audible communications from the wearer, and converting the audible communications to output communication signals, a boom member connecting the microphone to the mounting member for holding the microphone adjacent to the mouth of the wearer, and a signal conducting circuit for transmitting input communication signals from the first and second devices to the first and second speakers, respectively, and for transmitting output communications from the first microphone to the first device.

In accordance with a second aspect, the present invention is directed to a headset for communicating with two separate devices. The headset comprises a mounting member for mounting and holding the headset on the head of a wearer, at least a first speaker for receiving input communication signals and converting the input communication signals to audible communications for the wearer, means for connecting the speaker to the mounting member for holding the speaker adjacent to an ear of the wearer, first and second microphones for receiving audible communications from the wearer and converting the audible communications to output communication signals, a boom member connecting the microphones to the mounting member for holding the microphones adjacent to the mouth of the wearer, a signal conducting circuit for transmitting input communication signals from at least the first device to the first speaker, and for transmitting output communications from the first and second microphones to the first and second devices respectively, and a control device for providing gain control for the first and second microphones and the at least first speaker.

An object of the present invention is to provide an improved headset that enables an agent to communicate over both a telephone network and a computer network.

Another object of the present invention is to eliminate the need for an agent at a call center to use two separate headsets when sending or receiving voice communications via a telephone and a computer simultaneously or one after the other.

A further object of the present invention is to provide a single headset unit that allows a person to communicate on a telephone as well as the internet.

These and other objects are obtained with a headset, and a method for using a headset, to communicate with two separate devices. The headset comprises a mounting member for mounting and holding the headset on the head of a wearer, at least a first speaker, and means for connecting the speaker to the mounting member for holding the speaker adjacent an ear of the wearer. The headset further comprises first and second microphones, and a boom member for holding the microphones adjacent the mount of the wearer. A signal conducting circuit is provided for transmitting input communication signals from at least the first device to the first speaker, and for transmitting output communications from the first and second microphones to the first and second devices respectively.

In one exemplary embodiment, the headset comprises two microphones and two speakers. One microphone and speaker work with one device, ant the other microphone and speaker work with a second device. Using this headset, a person can use the two devices without switching headsets or having to wear two different headsets. In another exemplary embodiment, the headset comprises two microphones but only one speaker. This embodiment may be used, for example, by an agent at a call center to communicate calls over the public switched telephone network and to use a speech recognition program on a person computer.

Also, mute switches can be provided for each application or device with which the headset is used. By muting one application, an agent can use another. For example, the headset may be connected to both the public switched telephone network and to the internet, and to conduct an internet telephone call, the agent simply mutes the wireset that is linked to the public switched telephone network.

Further benefits and advantages of the present invention will become apparent from a consideration of the following detailed description, given with reference to the accompanying drawings, which specify and show preferred embodiments of the invention.

BRIEF DESCRIPTION OF THE DRAWINGS

The foregoing and other features and advantages of the present invention will be apparent from the following, more particular description of preferred embodiments of the invention, as illustrated in the accompanying drawings. In the drawings, like reference numbers indicates identical or functionally similar elements.

DETAILED DESCRIPTION OF THE PREFERRED EMBODIMENTS

Figure 1:
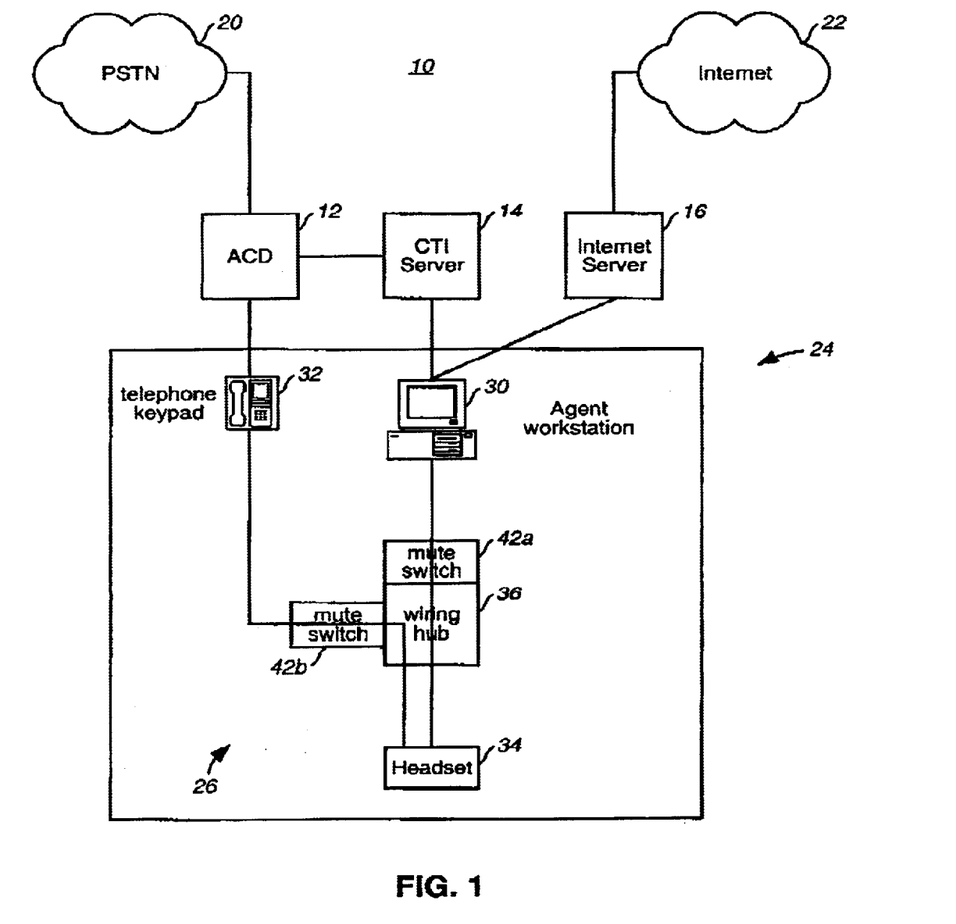
FIG. 1 illustrates a communications system architecture in which the present invention may be used.

FIG. 1 illustrates a simple communications system architecture 10 in which the present invention may be used. This communications architecture, which is used to process and route both contact requests and inbound calls, includes an automated call distributor (ACD) 12, a computer/telephony interface 14, an internet or web server 16, various communications networks, including the public switched telephone network (PSTN) 20 and the Internet 22, and a plurality of call centers, only one of which is shown at 24 in FIG. 1. Each call center 24 includes a multitude of agent stations, again only one of which is shown at 26 in FIG. 1, and each agent station includes an agent workstation 30, a telephone keypad 32 and a headset unit 34.

Generally, the automated call distributor 12 interfaces with the PSTN 20 for inbound and outbound calls, queries inbound calls, and distributes inbound calls among a plurality of agents. The Computer/Telephony Interface Server 14 is connected to the automated call distributor 12 and provides event data from the call distributor to various other elements of system 10, such as the agent workstations 26. Internet Server 16 supports Web sites, along with suitable software programs.

Agent workstation 30 is provided for running customer service software applications, receiving call data, and interfacing with the internet for internet protocol (IP) telephony sessions and collaborative HTTP sessions over the Web. Preferably, workstation 30 is or includes a personal computer. The teleset 32 is used for telephone calls over the PSTN 20 via the automated call distributor 12.

It should be noted that FIG. 1 illustrates a very simple example of a suitable communications system 10, and as will be understood by those of ordinary skill in the art, the system may be provided with additional elements or items. For example, system 10 may include an Enterprise Contact Server, an Enterprise Voice Response Unit, and an Enterprise Router, and each call center may include a Center Contact Server.

The Center Contact Server of each call center supports the agents at those centers. These Servers allow customers to place contact requests to a call center by any available communication means, including the internet, and to receive contacts from an agent by any available communications means.

The Enterprise Contact Server provides enterprise-level processing and routing of contact requests. The Enterprise Contact Server communicates with each Center Contact Server and tracks the states and availabilities of agents at each call center. Each Center Contact Server send event messages to the Enterprise Contact Server to continuously update the Enterprise Contact Server with current states and availability data. When a contact request is received, the Enterprise Contact Server can determine and select an available qualified agent among the agents at the plurality of call centers and then send the contact request to the Center Contact Server that supports the selected agent.

The Enterprise Router is a computer application that provides intelligent routing of inbound calls, and this Router may be provided in several embodiments. For example, the Router may be embodied as a distinct software application and database that resides on a computer different than the Enterprise Contact Server, or as a distinct software application and database that resides on the same computer as that Contact Server. As a further alternative, the Router may be integrated with the Enterprise Contact Server application as a process or sub-system. The preferred embodiment is to have the Enterprise Router as an application distinct from the Enterprise Contact Server, either on the same computer or different computers, and to have the Enterprise Contact Server interface with the Enterprise Router via an application program interface. This enables the use of different types and vendors' offerings of an Enterprise Router.

The Enterprise Voice Response Unit (VRU) provides interactive voice response (IVR) services for callers. The Enterprise VRU has a voice link to the PSTN 20, rather than to a call center ACD 12. This way, the Enterprise Contact Server VRU can receive calls over the PSTN, and can then route a call to any ACD 12 at any call center. One Enterprise VRU can be located with each call center 24, or one Enterprise VRU can be used for a plurality of call centers. The Enterprise VRU is connected to the Center Contact Server for the purpose of sending call data to that Contact Server.

In addition, each call center 24 may preferably include a local area network (LAN), and system 10 may include a data center. The local area network of each call center provides data connectivity among the various components of the call center. The system data canter is a LAN that provides data connectivity among the Web Server and Internet, the Enterprise Contact Server, the CTI Server, and the plurality of call centers. The Data Center is connected to each call center by a wide area network (WAN) that connects the LANs of each call center. This provides a physical interface among the Enterprise Contact Server and each Center Contact Server.

To place a contact request or an inbound call, a customer may use a standard telephone connected to the PSTN 20, a personal computer (PC) with an IP telephony application connected to the Internet 22 for placing IP telephone calls, or a personal computer with a Web browser connected to the Internet for interfacing with the Web.

More detailed descriptions of call center communication systems and of their components are given in copending patent application Ser. No. 08/976,162, filed Nov. 21, 1997, for Contact Server for Call Center, the disclosure of which is herein incorporated by reference.

The agents at call centers 24 are provided with headsets 34 that are designed to work with two separate devices. Each headset 34 is equipped with two or more microphones, and one or more speakers, as needed, that are each separately wired for use with different applications.

In one exemplary embodiment, represented in FIG. 1, the headset 34 comprises two microphones and two speakers. One microphone and speaker work with one device, and the other microphone and speaker work with a second device. This headset may be used, for example, by an agent at a call center to support voice calls over both the PSTN and the internet. One microphone/speaker set is wired to the telephone keypad for PSTN calls, and the second microphone/speaker set is wired to a personal soundcard on the agent's workstation for internet calls. Using this headset, a person can use the two devices without switching headsets or having to wear two different headsets.

In another exemplary embodiment, the headset has two microphones but only one speaker. This embodiment may be used, for example, by an agent at a call center to communicate calls over the PSTN and to use a speech recognition program on the personal computer workstation. One microphone/speaker set is wired to the telephone keypad for PSTN calls, and the second microphone is wired to the workstation for the speech recognition program. This speech recognition program does not require an ear speaker for the headset.

With still another exemplary embodiment, the headset has only one microphone and two speakers. This embodiment may be used, for instance, by a person to listen to music (not disturbing the caller of other neighbors) and speak on a telephone at the same time.

The headset is, in turn, connected to a wiring hub 36, which links each of the separate source devices, such as the workstation and the telephone keypad, that are wired to the headset. Hub 36 may be a black box with separate input/output ports and internal wire channels for each wireset. The hub may also simply be different bundlings of wires coming out of the headset, as shown at 40 in FIG. 2.

Figure 2:
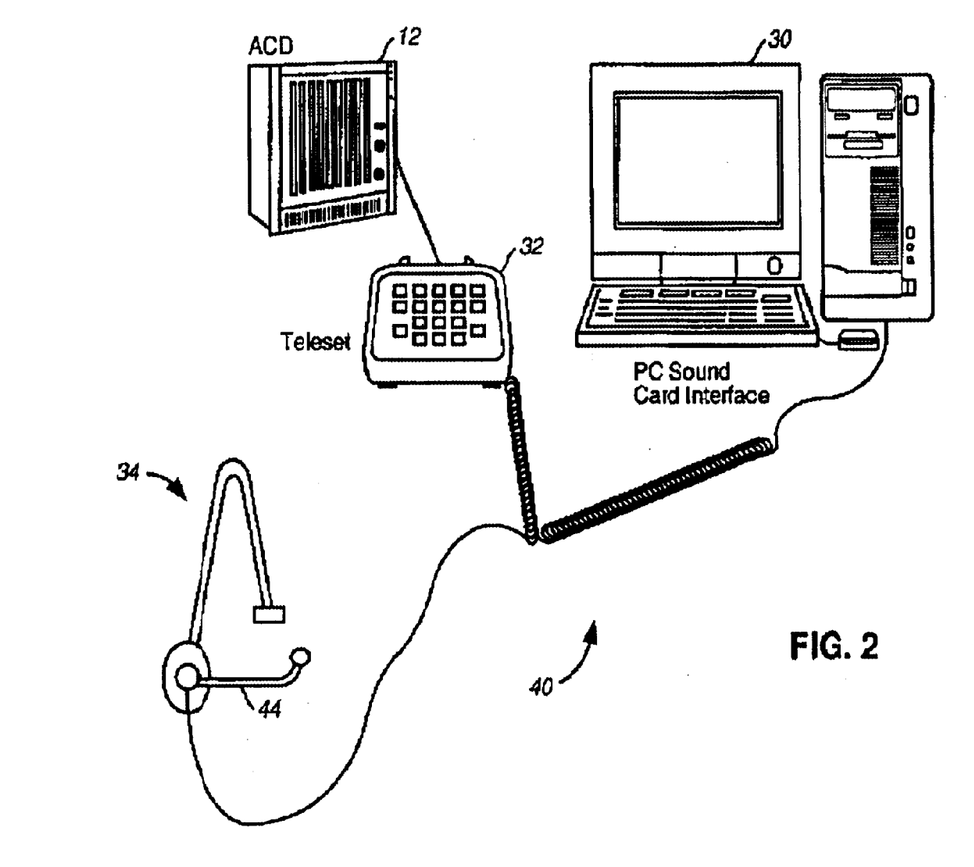
FIG. 2 illustrates a headset, embodying the present invention, used in an agent station of the system of FIG. 1.

As an additional feature, a hub 36 can be equipped with a mute switch 42a, 42b for each application wireset. By muting one application, an agent can use another. For example, to conduct an internet telephone call, the agent simply mutes the wireset that is linked to the PSTN telephone keypad.

It should be noted that the Mute button is completely optional. The user does not need to toggle the mute button to receive the call. The mute is just convenient.

The mute button may be configured to stop the signal from the speaker, the microphone, or both. Presented below is an example of each where the user in on the telephone with one line and used the mute on the other speaker/microphone.

A. Microphone mute: The user mutes the microphone to prevent voice signals from being sent to the other device, but still desires to listen to the second device. The second line could be connected to a PC playing music and accepting inputs to a speech recognition program. Or the second device could be a second phone conversation such as a conference call.

B. Speaker Mute: This allows the voice to be recorded by a PC or cassette recorder, but prevents the music from distracting the user.

C. Mute both to completely block the other device.

Figure 3:
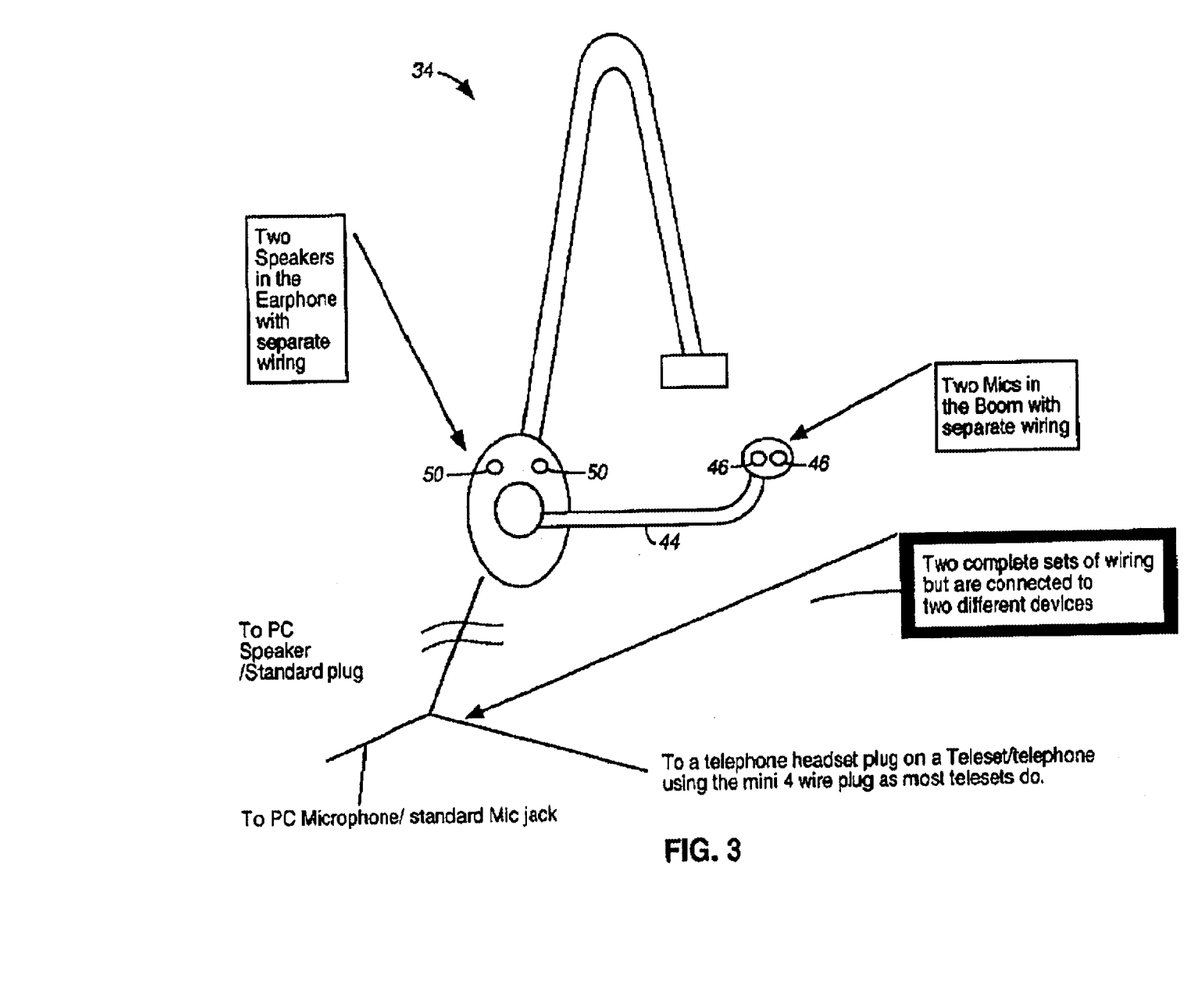
FIG. 3 illustrates a headset embodying the present invention having two speakers in one earphone.
Figure 4:
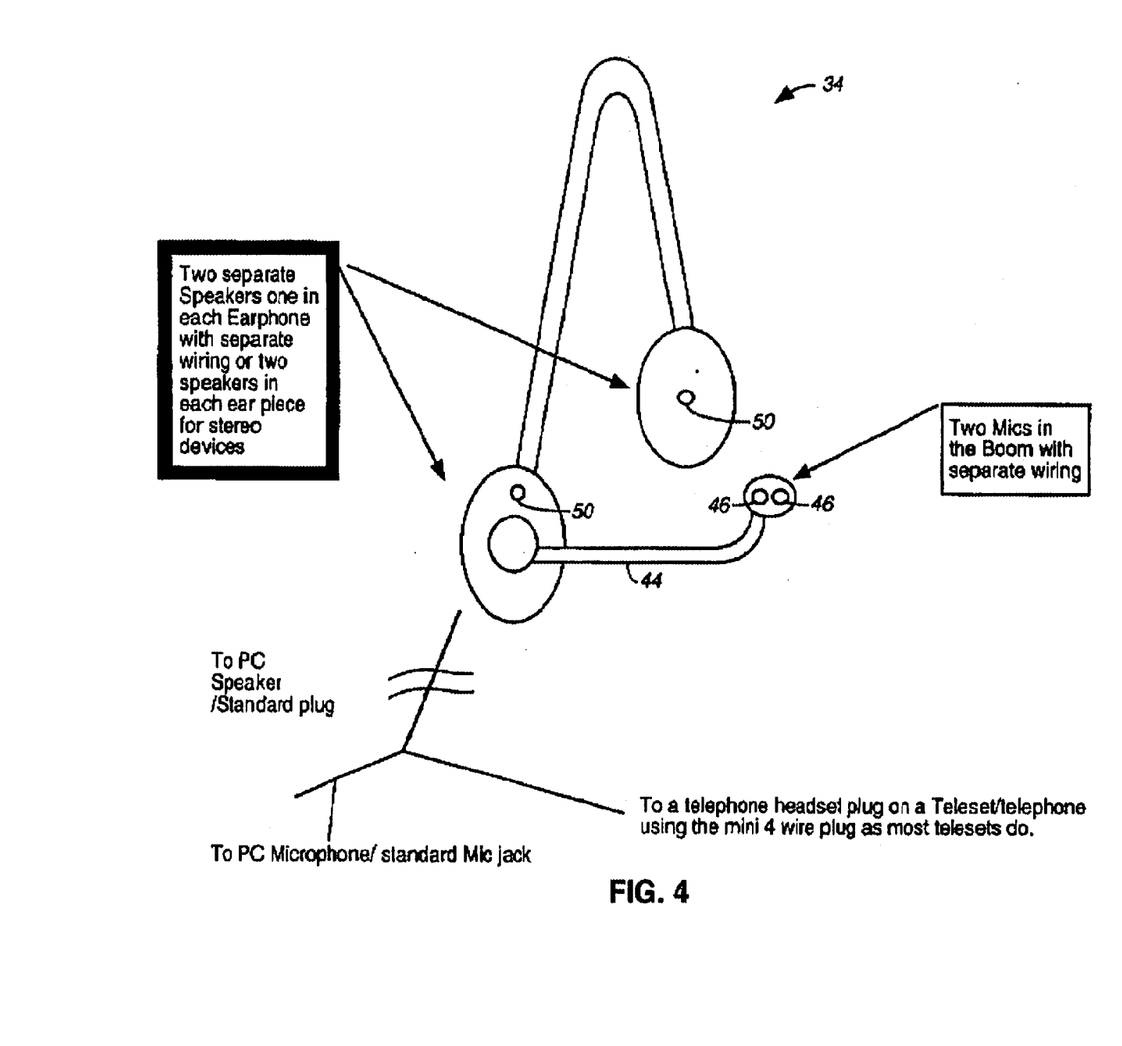
FIG. 4 illustrates an alternate headset having two speakers in each of two earphones.

Preferably, with reference to FIGS. 2–4, this multi-connect headset has a single microphone boom 44 which houses two separate microphones 46, and one or more speakers 50. The headset includes all the electronics of two separate headsets and a single frame. In use, one speaker may be placed in each ear of the agent, or two small speakers may be placed together for a single ear to listen to. Headset 34 may be upgraded to stereo by placing two separate speakers in both earpieces. The wiring for the headset may be encased together until near the plug point if necessary for aesthetic appeal and convenience.

It is preferred to use two separate microphones and two separate speakers, rather than to use a single microphone and speaker and to wire the plugs together, because different equipment may use different power/voltage/current for their uses. The wiring may cause an unpredictable feedback.

As mentioned above, headset 34 is equipped with one or more speakers. In particular, the headset is equipped with one speaker or one set of speakers for each application that requires a speaker. For example, in one exemplary embodiment, one speaker is wired to the headset for each application that requires a speaker. In another embodiment, two speakers in stereo may be wired for each application. Speakers for multiple applications may be placed in one earpiece, as shown in FIG. 3, or distributed between two earpieces, as shown in FIG. 4.

While the above discussion describes the use of the present invention for call center agents, the present invention has more general applications. In general, the present invention comprises a headset, or the use a headset, that supports connections to multiple devises and/or applications. For example, an individual at a home can use the headset to conduct an internet telephone call via a personal computer, while recording notes of their call on a word processor with speech recognition. Each of these applications may use different sound cards on the personal computer, and therefore different wiresets.

Also, as will be understood by those of ordinary skill in the art, the Contact Server is not necessary to the practice of the present invention. In fact, the headset of the present invention may be used by people who have nothing to do with call centers. The user does not even need a computer.

One additional use of the present invention is the prompting of VRU gathered information and/or audible screen-pop information.

Normally when a call arrives on and ACD, the agent is presented a "whisper tone" message announcing the company, division, or name of the caller as the call arrives. The whisper is sent by the ACD based on the original 800 number. With some network routing products the original 800 number is lost. The ACD cannot provide a useful whisper tone. A pre-recorded wav or other audio files can be used to play the message to the agent based on the same information that is used by a screen-pop such as ANI, DNIS, or Caller Entered Digits (CED) and present this audio message to the agent via the computer as the call arrives. This would not be limited to inbound calls. Voice messages can be played back from voicemail, IVR gathered messages, or from recordings gathered from the requester (caller) on the web. One connection of the headset can be to the PC and the other to the caller. Only the agent would hear this voice message. The Contact Server provides the appropriate "data" to the screen-pop application and delays the call from being sent to the agent until after the voice message has been played.

Although as discussed above, the headset controls four wires (two for each microphone and two for each speaker), the device could be modified to support other wiring configurations. For example, a headset (used with cordless phones and cell phones) may have one microphone and one speaker but use only their wires. Normally a speaker needs a receiving wire and a wire connected to an electrical ground. The microphone has a sending wire and a connection to an electrical ground (GND). A three wire device simply shares a common GND wire.

Suitable modification may also be made for stereo wiring. Stereo speakers need two separate conducting signal wires and a common (or separate) GND.

Figure 5:
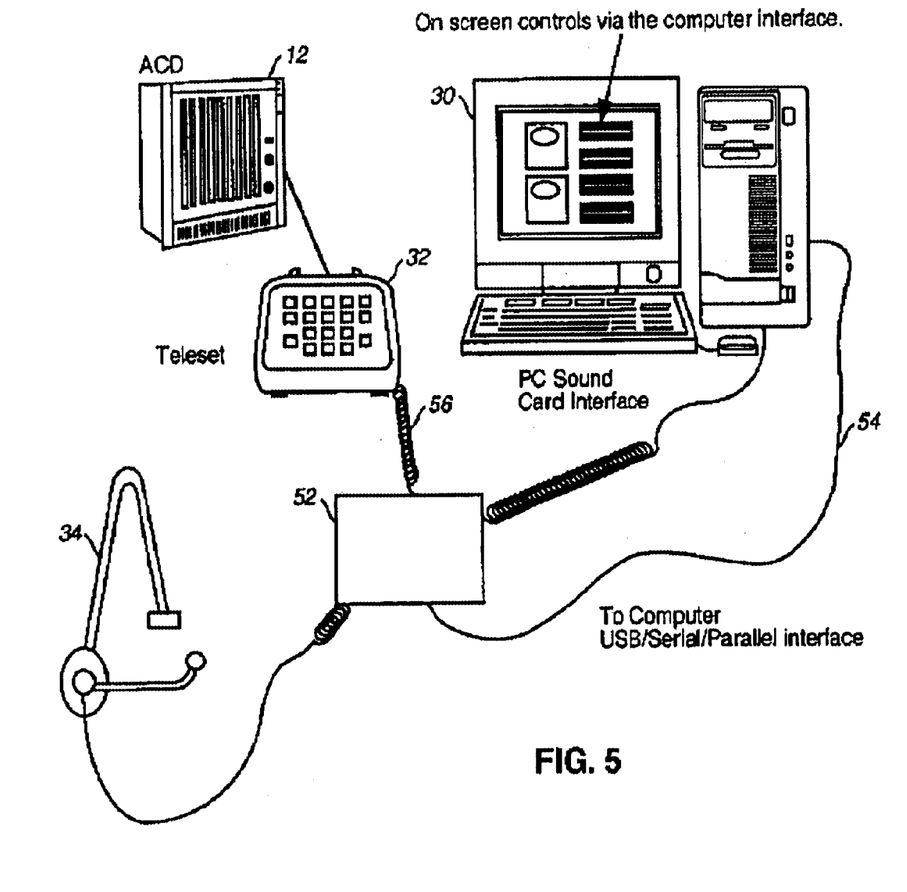
FIG. 5 illustrates a headset connected though a control device to other devices in accordance with the present invention.
Figure 6:
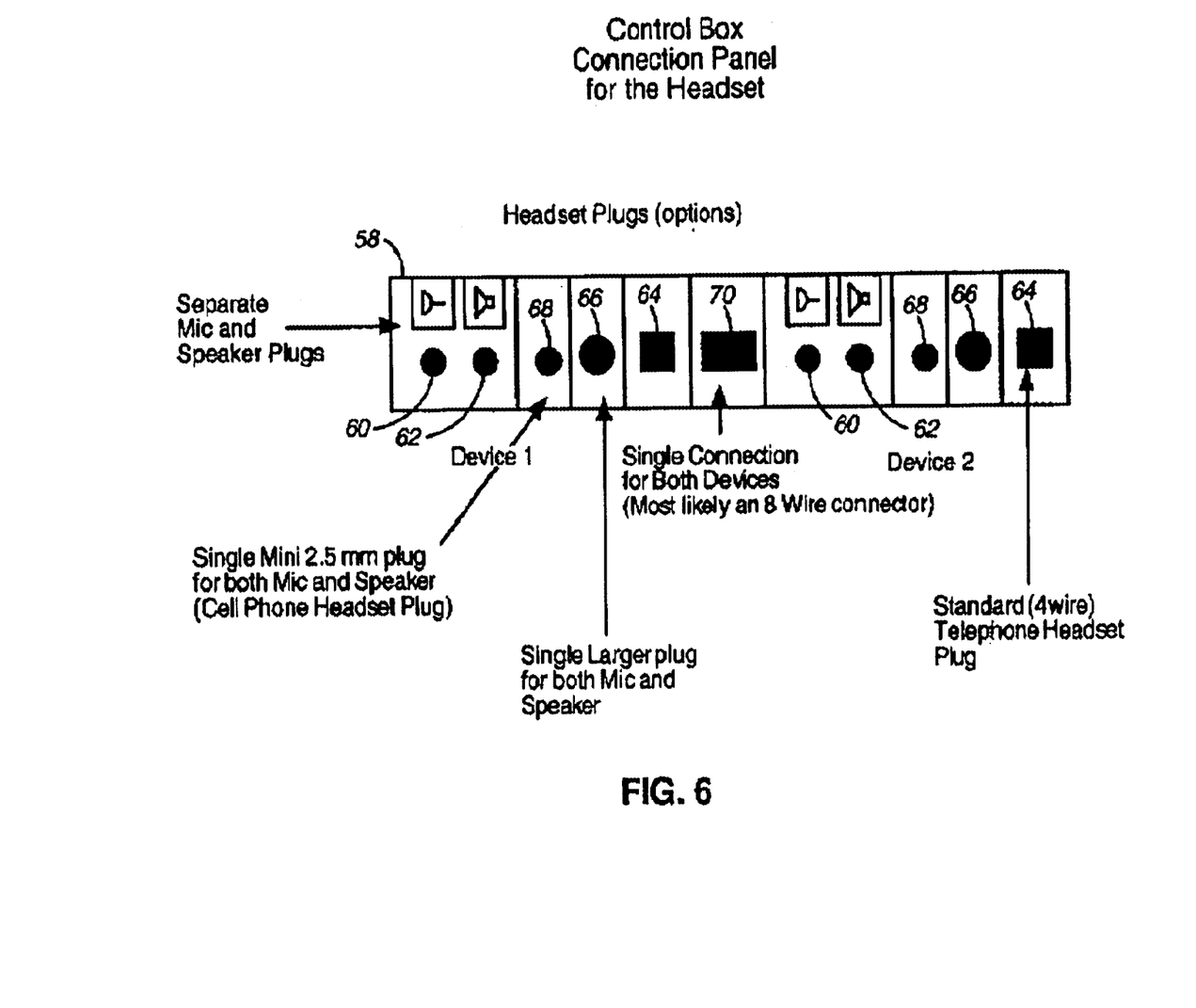
FIG. 6 illustrates a connection panel for the control device to the headset in accordance with the present invention.
Figure 7:
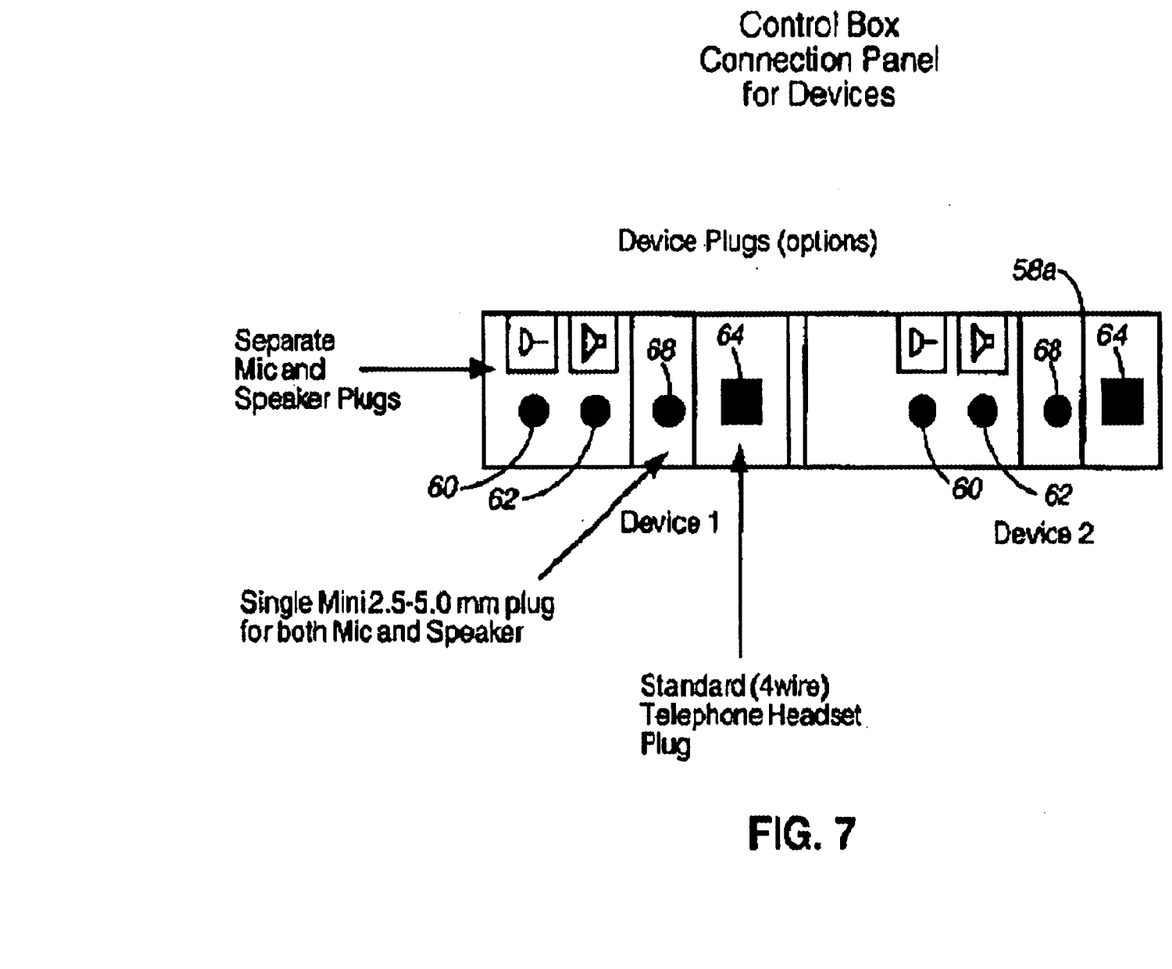
FIG. 7 illustrates a connection panel for the control device to the other devices in accordance with the present invention.

In yet another alternate embodiment, the headset may be connected to a control device. The control device may be utilized to provide gain control for the one or more microphones and for the one or more speakers, mute buttons and various adapter connections. FIG. 5 is a diagrammatic representation of the headset 34 connected through the control device 50 to the teleset 32 and workstation 30. The headset 34 may be connected to the control device 52 by any suitable means. For example, the connection may be made through a cable comprising the various types of connections described below. The control device 52 may be connected to the workstation 30 by any suitable means. For example, the connection may be made via a USB, serial, or parallel interface 54. The control device 52 is preferably connected to the teleset 32, via a standard telephone headset plug 56. FIG. 6 illustrates an exemplary embodiment of the connection panel 58 for the control device 52 to the headset 34. As illustrated, the panel 58 comprises separate microphone and speaker plugs 60, 62 for each device, a standard (4 wire) telephone headset plug 64 for each device, a single larger plug for both the microphone and speaker 66 for each device, a single mini 2.5 mm plug for both the microphone and speaker (cell phone headset plug 68) for each device, and a single connection for both devices 70. FIG. 7 illustrates an exemplary embodiment of the connection panel 58a for the control device 52 to the other devices. In this exemplary embodiment, the panel 58a comprises separate microphone and speaker plugs 60a, 62a for each device, a standard (4 wire) telephone headset plug 64a for each device and a single mini 2.5 mm plug for both the microphone and speaker (cell phone headset plug) 68 for each device.

Figure 8:
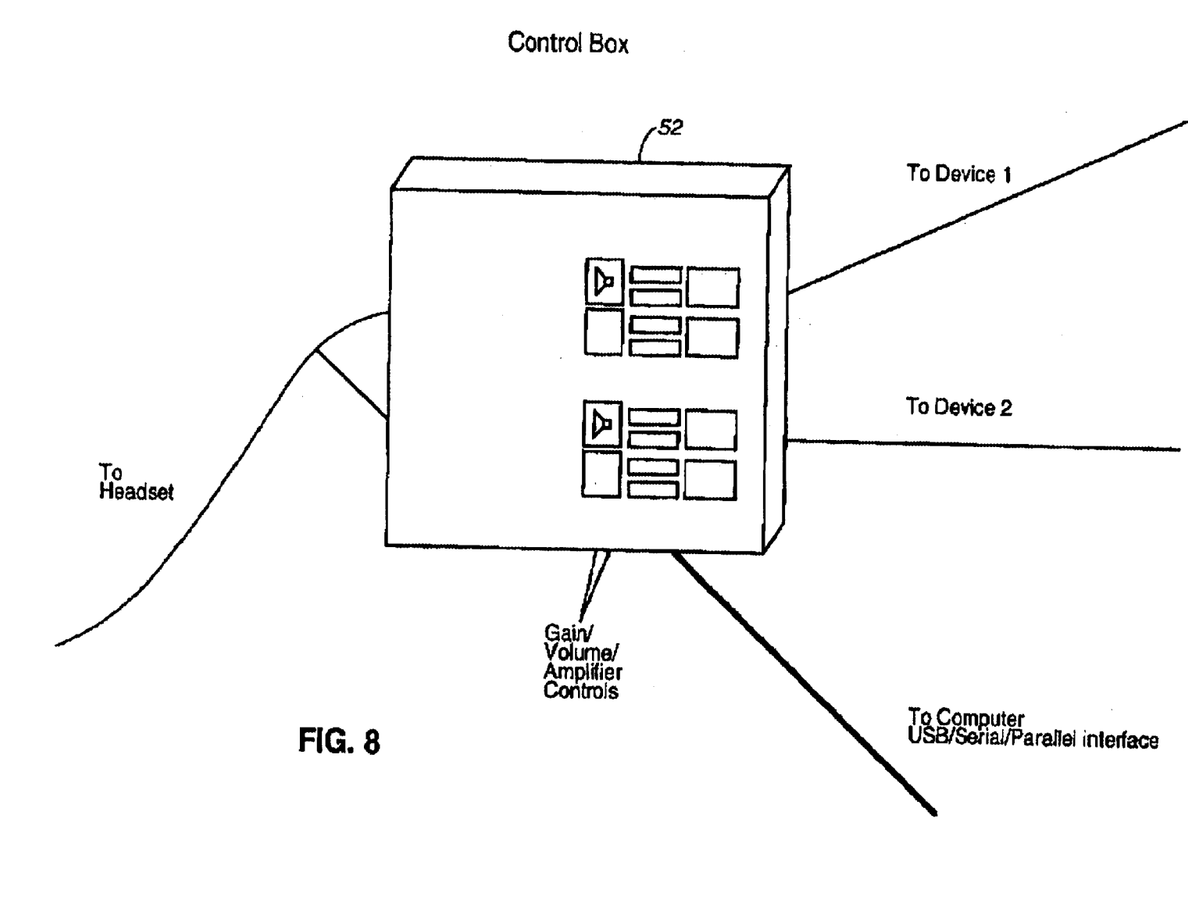
FIG. 8 is a diagrammatic representation of the control device in accordance with the present invention.

The settings controlled by the control device 52 may be set via the workstation via a software application. Alternately, the setting may be set via switches on control device 52 itself as illustrated in FIG. 8. As illustrated, the control device 52 may be utilized to mute the various devices to the control device 52 via switches/buttons 72 and the gain and volume for the speakers and microphones may be controlled via amplifier controls 74. The control device 32 may also comprise echo cancellation/suppression devices 76 for reducing or substantially eliminating echo. Echo cancellation/suppression devices are well know in the art.

The control device 52 may comprise any suitable configuration. For example, the control device 52 may be a stand alone device or it may be incorporated into the headset 34 itself. The control device 52 may also comprise any suitable type of power supply. For example, the device for converting standard AC power or a form suitable for use by the control device.

Although shown and described is what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modification that may fall within the scope of the appended claims.

What is claimed is:

1. A headset for communicating with two separate devices, comprising:

a mounting member for mounting the headset on the head of a wearer;

first and second speakers audibly disposed for the wearer;

first and second microphones disposed in a boom member adjacent to the mouth of the wearer; and a signal conducting circuit coupling the first device to the first speaker and the first microphone and coupling the second device to the second speaker and the second microphone, the signal conducting circuit being configured for separately muting each of the speakers by automatically reducing volume to a predetermined level.

2. A headset according to claim 1, further comprising:

a control device configured to provide gain control for the first and second microphones and at least one of the speakers.

3. A headset for communicating with two separate devices, comprising:

a mounting member for mounting and holding the headset on the head of a wearer;

at least a first speaker for receiving input communication signals and converting the input communication signals to audible communications for the wearer;

means for connecting the speaker to the mounting member for holding the speaker adjacent to an ear of the wearer;

first and second microphones for receiving audible communications from the wearer and converting the audible communications to output communication signals;

a boom member connecting the microphones to the mounting member for holding the microphones adjacent to the mouth of the wearer;

a signal conducting circuit for transmitting input communication signals from at least the first device to the first speaker, and for transmitting output communications from the first and second microphones to the first and second devices respectively; and a control device for providing gain control for the first and second microphones and the at least first speaker, wherein the control device further includes volume control for the first and second microphones and the at least first speaker, mute control for automatically reducing volume to a predetermined level, and echo cancellation/suppression.

4. The headset according to claim 3, wherein the signal conducting circuit includes:

means for transmitting output communication signals from the first microphone to the first device without transmitting to the first device any of the output signals from the second microphone; and means for transmitting output communication signals from the second microphone to the second device without transmitting to the second device any of the output signals from the first microphone.

5. The headset according to claim 3, wherein the signal conducting circuit includes means for separately muting each of the microphones.

6. The headset according to claim 3, wherein the control device further includes first and second control panels each having a plurality of adapters for interconnecting devices.

7. A headset to facilitate communication with a first device and a second device, comprising:

a first speaker configured to provide to the wearer audible information from the first device;

a second speaker configured to provide to the wearer audible information from the second device;

a control device for separately muting each of the speakers and for providing gain control for the first and second microphones and the speaker;

first and second microphones housed in a boom member and configured to provide output signals to the first device and the second device, respectively.

8. A headset to facilitate communication with a first device and a second device, comprising:

first and second speakers, in an earpiece, configured to provide to the wearer audible information from the first device and the second device;

a control device for separately muting each of the speakers by automatically reducing volume to a predetermined level; and first and second microphones, in a boom member configured to provide output signals to the first device and the second device, respectively.

9. A headset for interfacing a plurality of devices, comprising:

an earpiece housing a plurality of speakers associated with the respective devices; and a microphone boom extending from the earpiece and housing a plurality of microphones associated with the devices, wherein the speakers and the respective microphones are controlled independently to relay audible signals corresponding to the devices to a user of the headset.

10. A headset according to claim 9, wherein one of the devices includes a communications device for communicating over a telephone network and another one of the devices includes a computer for supporting calls over a data network.

11. A headset according to claim 9, further comprising:

a signal conducting circuit configured to transmit a signal from one of the microphones to one of the devices without transmitting to the one device a signal from another one of the microphones.

12. A headset according to claim 11, wherein the signal conducting circuit is further configured to separately mute each of the microphones.

13. A headset according to claim 11, wherein the signal conducting circuit is further configured to separately mute each of the speakers.

* * * * *